3,738,964
Patented June 12, 1973

---

3,738,964
AROMATIC POLYAMIDES DERIVED FROM A MIXTURE OF AROMATIC DIAMINES CONTAINING 4,4-DIAMINO-OXANILIDE
Frank Dobinson, Gulf Breeze, and Frank M. Silver, Pensacola, Fla., assignors to Monsanto Company, St. Louis, Mo.
No Drawing. Filed May 31, 1972, Ser. No. 258,108
Int. Cl. C08g 20/20
U.S. Cl. 260—47 CZ         6 Claims

ABSTRACT OF THE DISCLOSURE

A film- and fiber-forming aromatic polyamide comprising repeating units, wherein each unit is of the formula

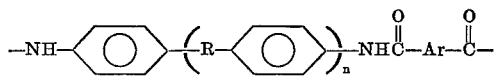

in which R represents a covalent bond or a divalent radical selected from

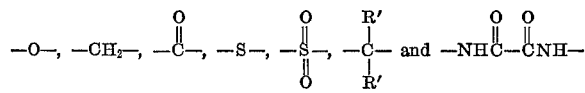

in which R' is a $C_1$ to $C_4$ alkyl group, Ar represents a para- or meta-phenylene radical and $n$ is 0 or 1, and wherein between 10 and 90 mole percent of said units are of said formula where R is

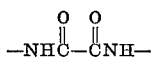

Fibers prepared from these polyamides are thermally stable, have a high modulus and are particularly useful as reinforcing elements for rubber and plastic articles.

BACKGROUND OF THE INVENTION

Aromatic polyamides, their preparation and the preparation of shaped articles, such as filaments, therefrom is generally known in the art. Exemplary patents relating thereto are: Kwolek U.S. 3,063,966; Morgan U.S. 3,414,645; and Kwolek U.S. 3,600,350.

An object of the present invention is to provide a new class of film- and fiber-forming aromatic polyamides and thermally stable, high-modulus fibers prepared therefrom.

SUMMARY OF THE INVENTION

The present invention provides a class of film- and fiber-forming aromatic polyamides consisting essentially of repeating units, wherein each unit is of the formula

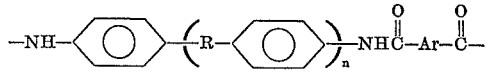

in which R represents a covalent bond or a divalent radical selected from the group consisting of

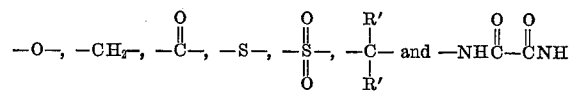

Ar represents a meta- or para-phenylene radical, $n$ is 0 or 1 and R' is a $C_1$ to $C_4$ alkyl radical (e.g. methyl), and wherein between 10 mole percent and 90 mole percent of said units are of the formula

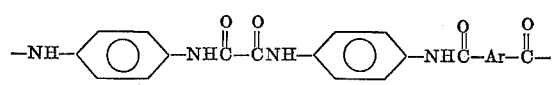

The polyamides of this invention may be prepared and processed into fibers according to techniques described in the foregoing mentioned patents. As described in these patents, aromatic polyamides are prepared by solution or interfacial polymerization techniques and fibers thereof are generally prepared by either dry spinning or wet spinning techniques. Preferably, the fibers are prepared by wet spinning techniques in which a solution of the polyamide (dope) is extruded into a suitable coagulation bath to form filaments that are subsequently washed, processed and packaged.

According to a preferred embodiment of the invention, the polyamides of the present invention and spinning solutions (i.e. dopes) thereof are prepared by the so-called "coupled" process as described in U.S. Pats. 3,600,350 and 3,414,645. The dopes can be utilized for the preparation of films, filaments, fibrids and coatings.

The aromatic polyamides described herein are prepared from substantially equimolar amounts of a diamine reactant and an aromatic diacid halide reactant.

Diamine reactant

The diamine reactant consists essentially of a mixture of two or more diamines of the formula

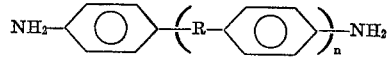

where R is a covalent bond or a radical selected from the group consisting of

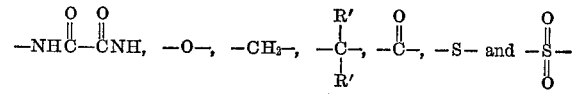

$n$ is 0 or 1, and R' is a $C_1$ to $C_4$ alkyl group, with the proviso that at least 10 mole percent of said mixture consists of 4,4'-diamino-oxanilide. Typical aromatic diamines of the above formula are:

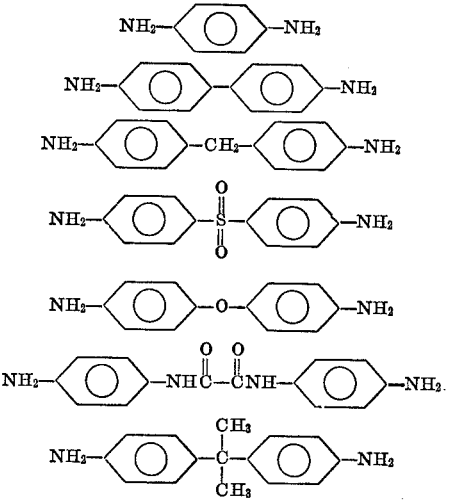

Examples of diamine reactants that are useful in preparing the polyamides described herein are:

(A) a mixture of 4,4'-diamino-oxanilide and para-phenylenediamine;
(B) a mixture of 4,4'-diamino-oxanilide and 4,4'-oxydianiline; and
(C) a mixture of 4,4'-diamino-oxanilide, para-phenylenediamine and 4,4'-oxydianiline;

wherein at least 10 mole percent of the mixture consists of 4,4'-diamino-oxanilide.

Aromatic diacid halide reactant

The aromatic diacid halide reactant consists essentially of terephthaloyl halide (e.g. chloride), isophthaloyl halide (e.g. chloride) or mixtures thereof, with terephthaloyl chloride or a mixture of terephthaloyl chloride and isophthaloyl chloride which contains at least about 90 mole percent terephthaloyl chloride being particularly preferred.

Polymer and fiber preparation

In a typical preparation of a dope containing the polyamides of the present invention, the diamine reactant (e.g. a mixture of diamines consisting of 4,4'-diaminooxanilide and p-phenylenediamine in a mole ratio of 2:1) is added with stirring to a solvent consisting essentially of a 1–10% by weight solution of lithium chloride in N,N-dimethylacetamide (DMAc). After the resulting slurry is cooled to about 0° C. a substantially equimolar amount, based on the diamine reactant, the aromatic diacid halide reactant (e.g. terephthaloyl chloride) is added thereto. The reaction mixture is stirred to obtain a clear, viscous dope, i.e., polyamide solution; high-speed stirring or shearing action may be required to attain a clear dope due to the solubility characteristics of aromatic polyamides in which the divalent aromatic radicals are para oriented to one another. Additional solvent may be added during or after dope preparation to obtain the desired polymer concentration.

Spinning solutions of the polyamides described herein may be used to prepare fibers according to conventional solution spinning techniques, such as the dry jet-wet spinning technique described in U.S. Pat. 3,414,645.

The following examples illustrate the preferred embodiments of the invention. Unless otherwise specified, percentages given in the examples are weight percentages.

PREFERRED EMBODIMENTS OF THE INVENTION

Example 1

Into a flame-dried, nitrogen-blanketed, 3-liter resin kettle, equipped with a double-helix stirrer and a nitrogen inlet system, there were added 24.327 grams (0.09 mole) of 4,4'-diamino-oxanilide, 9.732 grams (0.09 mole) of para-phenylenediamine and 1110 ml. of a 5% solution of anhydrous LiCl in N,N-dimethylacetamide (DMAc). The contents of the kettle were stirred at 23° C. until a homogeneous solution was attained (about 1 hour). The solution was cooled to 0° C. by means of an ice-bath. To the cooled, rapidly stirred (500–700 r.p.m.) solution, 36.546 grams (0.18 mole) of crystalline terephthaloyl chloride was added all at once; stirring was continued for 2 hours, after which time, an amber-colored, bright, viscous dope was obtained. The dope was neutralized over a 15-minute period by dropwise addition of a ball-milled mixture of 8.622 grams (0.36 mole) of anhydrous LiOH and 90 ml. of a 5% solution of anhydrous LiCl in DMAc (DMAc/5% LiCl). After dilution of the dope with 180 ml. of DMAc/5% LiCl, the final polymer solids concentration was 3.9%. The viscosity of the dope was about 1700 poise. A sample of the polymer was precipitated from the dope by adding a small amount of the dope to a vessel containing water. The precipitated polymer was isolated and washed in a Waring Blendor with a mixture of methanol and water and dried in a vacuum oven at 80° C. for 24 hours. The inherent viscosity of the polymer was 6.6, as measured at 25° C. in concentrated sulfuric acid containing 2% polymer.

A 6-mil film was cast on a glass plate with a Gardner knife, washed with water and dried in a vacuum oven for 8 hours at 80° C. The resulting clear, tough film was capable of being cold-drawn.

The remainder of the polymer dope was transferred to a cylindrical, stainless-steel spinning vessel. Fibers were spun from a 5-hole, 6-mil spinneret through a half-inch air gap into a water bath at 23° C. Clear fiber was wound up on a pair of Godet rolls immersed in a wash bath of water at 23° C., at a rate sufficient to impart to the fiber a jet-stretch 0.8 to >2.5 times in the air gap. The washed fiber was then passed through a two-foot cascade bath of water at 50° to 90° C., and over a second set of Godet rolls to impart a cascade-stretch of 1.0 to >2.5 times to the fiber; this second set of Godet rolls were immersed in a separate water bath maintained at 45° C. The fiber was then dried on a set of steam-heated rolls and wound onto a bobbin. The as-spun fiber had a tenacity/elongation at break/modulus at 1% extension (T/E/M) values, as measured on Instron equipment, of 2.6 grams per dienier/>50%/56 grams per denier (g.p.d.). The fiber was then hot-stretched 1.7 times over a hot-shoe (200°–230° C.) to provide fiber having a T/E/M of 7.8 g.p.d./2.4%/383 g.p.d. Further heat treatment of the fiber, i.e., passage thereof while under tension through a vessel heated to 500° C. (residence time of 1.2 seconds), imparted a slight stretch to the fiber (1.04 times) and yielded fiber having a T/E/M of 11.5 g.p.d./1.8%/598 g.p.d.

Example 2

Fiber was prepared as in Example 1 with the exception that the mole ratio of reactants used in this instance was 0.6:0.4:1.0, 4,4'-diamino-oxanilide to para-phenylenediamine to terephthaloyl chloride. The polymer had an inherent viscosity of 4.3 as measured at 25° C. in concentrated sulfuric acid containing 0.5% polymer. The as-spun fiber had T/E/M values of 2.7 g.p.d./45%/81 g.p.d. The fiber was then hot-stretched over a 250° C. hot-shoe and heat treated at 500° C., as in Example 1. The T/E/M values of the resulting fiber were 13.1 g.p.d./1.4%/852 g.p.d.

Example 3

Following the procedure of Example 1, 8.108 grams (0.03 mole) of 4,4'-diamino-oxanilide, 6.004 grams (0.03 mole) of 4,4'-oxydianiline and 12.182 grams (0.06 mole) of terephthaloyl chloride were reacted in 370 ml. of an anhydrous solution of 5% LiCl in DMAc to provide an amber-colored, bright, viscous dope which was neutralized over a 10-minute period by dropwise addition of a mixture of 2.874 grams (0.12 mole) of anhydrous LiOH and 30 ml. of anhydrous DMAc/5% LiCl. The final polymer concentration of the dope was 5.2%. The inherent viscosity of the polymer was 3.9, as measured at 25° C. in concentrated sulfuric acid containing 0.2% polymer. A 6-mil clear, tough film of the polymer was prepared as in Example 1. This film was capable of being cold-drawn.

Fiber was prepared from the polymer dope utilizing the same technique and equipment as in Example 1. The as-spun fiber had a tenacity of 2.6 g.p.d. and an elongation at break of greater than 60%. Hot-stretching the fiber 2.4 times over a hot-shoe (200°–230° C.) provided fiber having T/E/M values of 8.6 g.p.d./4.1%/269 g.p.d. Further heat treatment at 550° C. with no further stretch, using the apparatus and procedure as described in Example 1, provided fiber with T/E/M values of 11.2 g.p.d./6.0%/217 g.p.d.

Example 4

The procedure of Example 1 was repeated using the apparatus described therein to prepare two additional fibers. The dopes from which the fibers were spun were prepared as in Example 3, with the exception that the mole ratio of the diamine reactants was varied in each instance. The polymer of Fiber 1 and Fiber 2 was prepared by reacting 4,4'-diaminooxanilide, 4,4'-oxydianiline and terephthaloyl chloride in a mole ratio of 0.8:0.2:1 and 0.65:0.35:1, respectively. The inherent viscosity of the polymer of Fiber 1 and Fiber 2 was 3.3 and 2.0, respectively, as measured at 25° C. in concentrated sulfuric acid containing 0.5% polymer. The T/E/M values of each fiber is given below:

| | Fiber 1 | Fiber 2 |
|---|---|---|
| As-spun fiber | 2.5 g.p.d./50%/70 g.p.d. | 1.4 g.p.d./31%/46 g.p.d. |
| After 255° C. hot-stretch. | 8.3 g.p.d./2.1%/426 gp.d. | 2.8 g.p.d./3.5%/131 g.p.d. |

The foregoing examples illustrate specific embodiments of the invention. It will be apparent to those skilled in the art that the preparation of spinning dopes containing the polyamides of this invention may be carried out utilizing solvents other than those specifically described, e.g., tetramethylurea, hexamethylphosphorictriamide, N-methyl pyrollidone, or mixtures of solvents, all of which contain dissolved LiCl or an equivalent salt, such as $CaCl_2$, $SrCl_2$, etc. Also, the polymer may be precipitated from the polymerization solvent and redissolved in concentrated sulfuric acid to provide spinning dopes from which fibers of the polyamides of the present invention may be prepared.

What is claimed is:

1. A film- and fiber-forming polyamide consisting essentially of repeating units of the formula (A)

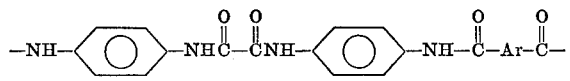

and units of the formula (B)

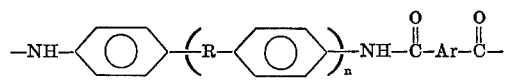

wherein Ar represents a meta-phenylene or para-phenylene radical, R represents a radical selected from the group consisting of

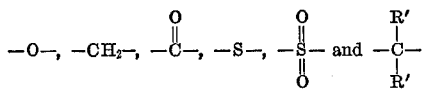

in which R' is a $C_1$ to $C_4$ alkyl radical and $n$ represents 0 or 1, and wherein between 10 and 90 mole percent of said repeating units are units of said formula (A).

2. The polyamide of claim 1, wherein said repeating units consist essentially of units of the formula (A)

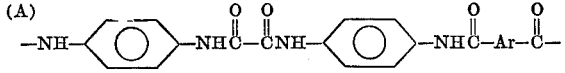

and units of the formula (B)

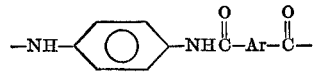

3. The polyamide of claim 1, wherein said repeating units consist essentially of units of the formula (A)

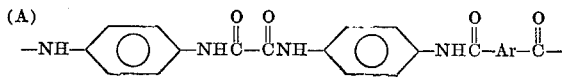

and units of the formula (B)

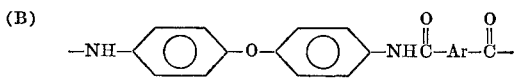

4. The polyamide of claim 1, wherein said repeating units consist essentially of units of the formula (A)

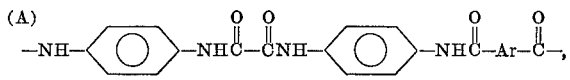

units of the formula (B)

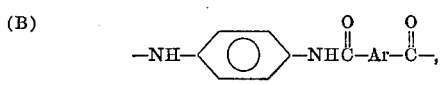

and units of the formula (C)

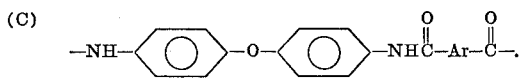

5. The polyamide of claim 1, wherein each Ar represents a para-phenylene radical.

6. A fiber of the polyamide of claim 1.

References Cited

UNITED STATES PATENTS

| | | | |
|---|---|---|---|
| 3,094,511 | 6/1963 | Hill et al. | 260—78 |
| 3,049,518 | 8/1962 | Stephens | 260—78 |
| 3,471,444 | 10/1969 | Sherer et al. | 260—65 |
| 3,551,385 | 12/1970 | Bach | 260—63 |

WILLIAM H. SHORT, Primary Examiner

L. L. LEE, Assistant Examiner

U.S. Cl. X.R.

160—30.2, 30.6 R, 32.4, 32.6 N, 63 N, 78 R